United States Patent
Lund et al.

(10) Patent No.: US 8,451,979 B2
(45) Date of Patent: May 28, 2013

(54) SYSTEM FOR CORRELATING A SUBSCRIBER UNIT WITH A PARTICULAR SUBSCRIBER IN A PASSIVE OPTICAL NETWORK

(75) Inventors: Robert M. Lund, Edina, MN (US);
Chris D. Koch, Minneapolis, MN (US);
Milton J. Johnson, Lakeville, MN (US);
Joel K. Lagerquist, St. Paul, MN (US);
Daniel R. Oelke, Elk River, MN (US);
Jeffrey T. Kays, Andover, MN (US);
Joseph J. Knudsen, Hugo, MN (US);
Steven J. Talus, Plymouth, MN (US)

(73) Assignee: Calix, Inc., Petaluma, CA (US)

( * ) Notice: Subject to any disclaimer, the term of this patent is extended or adjusted under 35 U.S.C. 154(b) by 1598 days.

(21) Appl. No.: 09/873,933

(22) Filed: Jun. 4, 2001

(65) Prior Publication Data

US 2002/0184644 A1   Dec. 5, 2002

(51) Int. Cl.
*H04M 1/24* (2006.01)

(52) U.S. Cl.
USPC .................. 379/21; 379/27.01; 379/29.11

(58) Field of Classification Search
USPC .............. 379/1.01, 21, 27.01, 29.01, 29.09, 379/29.1, 29.11, 32.01, 201.01, 251; 359/110, 359/164, 167, 168, 120; 385/24
See application file for complete search history.

(56) References Cited

U.S. PATENT DOCUMENTS

| | | | |
|---|---|---|---|
| 5,420,572 A * | 5/1995 | Dolin et al. ............. 340/825.22 |
| 5,488,413 A | 1/1996 | Elder et al. | |
| 5,748,348 A | 5/1998 | Heidemann et al. | |
| 5,761,246 A | 6/1998 | Cao et al. | |
| 5,818,906 A * | 10/1998 | Grau et al. ................ 379/32.04 |
| 5,835,580 A * | 11/1998 | Fraser ....................... 379/115.01 |
| 5,835,757 A | 11/1998 | Oulid-Aissa et al. | |
| 5,907,417 A | 5/1999 | Darcie et al. | |
| 5,935,209 A * | 8/1999 | Budhraja et al. ............. 709/223 |
| 6,002,746 A * | 12/1999 | Mulcahy et al. ............... 379/22 |
| 6,078,589 A | 6/2000 | Kuechler | |
| 6,108,112 A | 8/2000 | Touma | |
| 6,122,350 A | 9/2000 | Reeder et al. | |
| 6,163,594 A * | 12/2000 | Kennedy et al. ............... 379/21 |
| 6,349,093 B1 | 2/2002 | Caldwell et al. | |
| 6,353,609 B1 | 3/2002 | Ethridge et al. | |
| 6,493,425 B1 * | 12/2002 | Abe ............................ 379/1.01 |
| 6,498,667 B1 | 12/2002 | Masucci et al. | |
| 6,539,384 B1 | 3/2003 | Zellner et al. | |
| 6,577,414 B1 | 6/2003 | Feldman et al. | |
| 6,633,541 B1 | 10/2003 | Hijikata et al. | |
| 6,665,315 B1 | 12/2003 | Karasawa | |
| 6,721,506 B1 | 4/2004 | Lam | |
| 6,754,310 B1 * | 6/2004 | Steinbrenner et al. ..... 379/29.01 |
| 6,823,225 B1 | 11/2004 | Sass | |

(Continued)

OTHER PUBLICATIONS

"Newton's Telecom Dictionary" by Harry Newton, 1998, p. 115.

(Continued)

*Primary Examiner* — Barry Taylor
(74) *Attorney, Agent, or Firm* — Shumaker & Sieffert, P.A.

(57) ABSTRACT

A system for correlating a subscriber unit to a physical port in a point to multipoint wire line network is disclosed. An installer is prompted to manually input a location code associated with the subscriber. The location code in the subscriber unit is received, and is transmitted via the network to a central repository. The location code is stored in the central repository toward associating the location code with the physical port.

39 Claims, 2 Drawing Sheets

U.S. PATENT DOCUMENTS

| | | | |
|---|---|---|---|
| 6,850,708 B2 | 2/2005 | Condict et al. | |
| 6,895,189 B1 | 5/2005 | Beddrosian | |
| 6,952,836 B1 | 10/2005 | Donlan et al. | |
| 7,062,549 B1* | 6/2006 | Miller et al. | 709/223 |
| 2002/0032765 A1* | 3/2002 | Pezzutti | 709/223 |
| 2002/0071149 A1 | 6/2002 | Xu et al. | |
| 2002/0135843 A1 | 9/2002 | Gruia | |
| 2003/0099014 A1 | 5/2003 | Egner et al. | |
| 2004/0254757 A1* | 12/2004 | Vitale et al. | 702/122 |

OTHER PUBLICATIONS

The prosecution history for related divisional U.S. Appl. No. 11/065,323, filed Feb. 24, 2005.

Office Action for U.S. Appl. No. 11/065,323, mailed Aug. 2, 2007, 12 pages.

Amendment to Office Action mailed Aug. 2, 2007 for U.S. Appl. No. 11/065,323, filed Dec. 3, 2007, 16 pages.

Office Action for U.S. Appl. No. 11/065,323, mailed Feb. 7, 2008, 12 pages.

Amendment to Office Action for U.S. Appl. No. 11/065,323, filed May 7, 2008, 19 pages.

Interview Summary for U.S. Appl. No. 11/065,323, filed Aug. 10, 2007, 2 pages.

Notice of Panel Decision from Pre-Appeal Brief Review for U.S. Appl. No. 11/065,323, mailed Dec. 15, 2008, 3 pages.

Appeal brief for U.S. Appl. No. 11/065,323, filed Feb. 18, 2009. 53 pages.

Office Action for U.S. Appl. No. 11/065,323, mailed Jul. 18, 2008, 15 pages.

Examiner's Answer in response to the Appeal Brief for U.S. Appl. No. 11/065,323, mailed Jul. 10, 2009, 40 pages.

Doyle, "Routing TCP/IP," vol. 1, Cisco Press, 1998, pp. 29-63.

Droms, RFC-2131, "Dynamic Host Configuration Protocol," IETF, Mar. 1997, pp. 1-45.

Reply Brief for U.S. Appl. No. 11/065,323, filed Sep. 10, 2009, 17 pages.

Request for Rehearing for corresponding U.S. Appl. No. 11/065,323, filed Nov. 30, 2012, 7 pages.

Decision on Request for Reconsideration for corresponding U.S. Appl. No. 11/065,323, dated Dec. 26, 2012, 7 pages.

Appeal Brief for corresponding U.S. Appl. No. 11/065,323, filed Apr. 16, 2009, 51 pages.

Decision on Appeal for corresponding U.S. Appl. No. 11/065,323, dated Oct. 1, 2012, 14 pages.

\* cited by examiner

SYSTEM FOR CORRELATING A SUBSCRIBER UNIT WITH A PARTICULAR SUBSCRIBER IN A PASSIVE OPTICAL NETWORK

BACKGROUND OF THE INVENTION

1. Field of the Invention

The present invention is directed to communications networks and, in particular to a system for configuring subscriber equipment upon installation within a communication network.

2. Background Art

Transmission of data (voice, video and/or data) over fiber optic cabling is becoming common place. For instance, optical transmission is heavily used for long-distance (or inter-LATA) telephone transmission. Where fiber optic communication has been used in local exchanges (sometimes referred to as a Local Access & Transport Area or "LATA") a passive optical network ("PON") has been used. The name PON arises from the use of passive splitters (e.g. star couplers) to distribute signal between the central office (CO) and multiple, spatially distributed subscriber locations via fiber optic cables. PONs are one example of point to multipoint wire line networks.

Point to multipoint wire line networks have various benefits including, but not limited to, the lower equipment costs. These lower equipment costs over traditional point to point networks arise, in part, due to the absence of dedicated lines and ports for each subscriber. However, because there is no unique port (path) linking each subscriber to the network, there is no inherent means for uniquely identifying the downstream path to any particular subscriber. Such a path is required, for instance, to appropriately terminate an incoming voice call for any particular subscriber (e.g. the subscriber at (212) 555-1212). Thus, while the service provider knows the identity of any particular subscriber at installation, a passive optical network does not. Consequently, in order to deliver communications and uniquely desired service to each subscriber, there is a need to establish some correlation between the subscriber's identification and the optical network unit ("ONU") serving that location.

SUMMARY OF THE DISCLOSURE

A number of technical advances are achieved in the art, by implementation of a method for correlating a subscriber unit to a physical port in a point to multipoint wire line network. The method comprises: (a) prompting an installer to manually input a location code associated with the subscriber; (b) receiving the location code in the subscriber unit; (c) transmitting the location code via the network to a central repository; and (d) storing the location code in the central repository toward associating the location code with the physical port. In some approaches, storing may further including checking the location code for errors before storing and upon finding an error, transmitting an instruction to the subscriber unit to indicate error to the installer and upon finding no errors, storing the location code. When the installer receives an error indication there may also be a further prompt to reinput the location code.

The method may also include transmitting the site code and storing it in the central repository.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principals of the invention. Moreover, in the figures, like reference numerals designate corresponding parts throughout the different views.

DETAILED DESCRIPTION OF THE PREFERRED EMBODIMENTS

When a universal demarcation point ("UDP") 50 is installed in a passive optical network ("PON") 40 by installer 20, optical network unit ("ONU") 51 of UDP 50 must be configured to receive and transmit signals correctly over the PON. Configuration of the ONU 51 with the PON facilitates proper communication to occur between installed UDP 50 and its associated optical line termination ("OLT") 52 (shown in FIG. 1 as being located at central office 41). Thus, for instance, configuration may register the serial number of the UDP 50, ONU 51 and even correlate that UDP and ONU with the equipment along the branch by which UDP 50 is operably connected to the PON. However, configuration does not correlate the identity of subscriber 30 (i.e. John Smith) with ONU 51 or even OLT 52. This correlation is important because generally a PON will include a plurality of subscribers, OLTs and ONUs. Each of these subscribers are operably connected to the central office via a series of fiber optic cables, passive optical splitters, and a specific optical line terminator ("OLT") located at the central office in a "tree structure."

Figure 1:
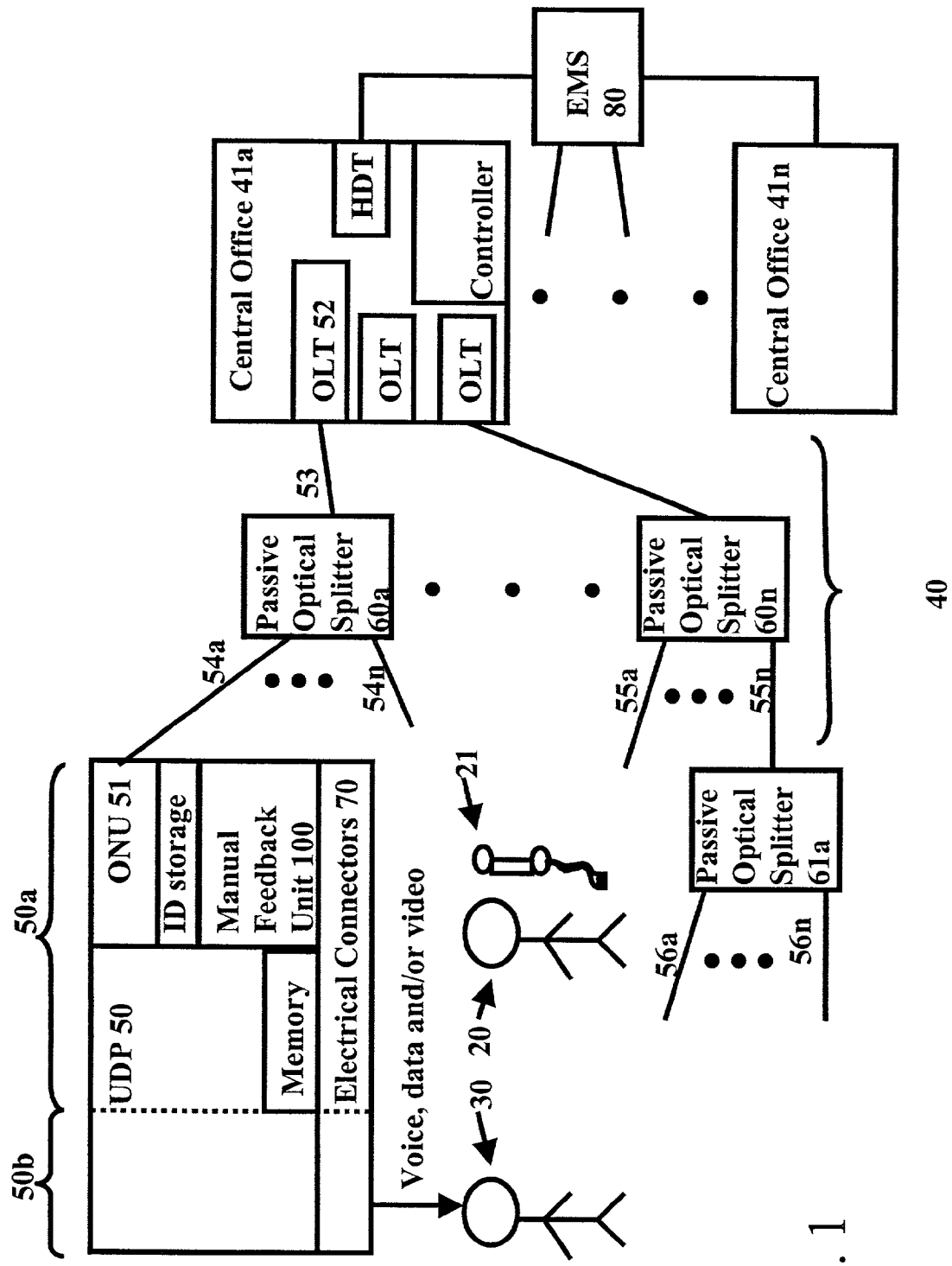
FIG. 1 of the drawings is a block diagram of one universal demarcation point connected to a passive optical network that has a universal demarcation point associated with each of its plurality of subscribers.
Figure 2:
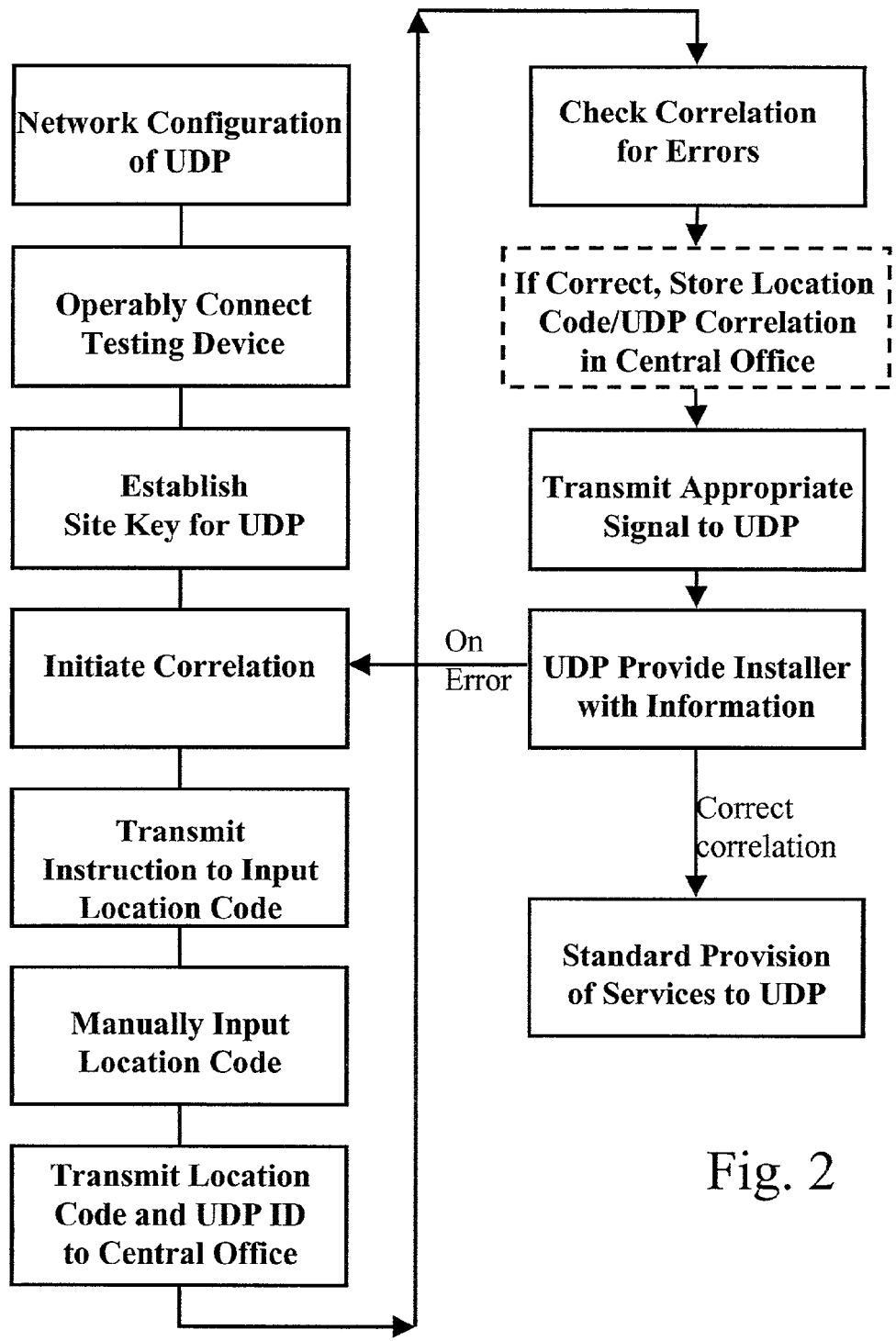
FIG. 2 of the drawings is flow diagram of the method for correlating a optical network unit with the central office.

FIG. 1 generally illustrates, among other things, one PON tree topology and particularly one particular branch in the PON tree structure. As shown in FIG. 1, UDP 50 is equipped to receive information including voice, video and data content. It would be understood by those of skill in the art having the present specification before them that alternative topologies will also work with the disclosed invention. As illustrated, subscriber 30 is operably connected to central office 41 via OLT 52, fiber optic cable 53, optical splitter 60*a*, fiber optic cable 54*a* and UDP 50. Thus, as depicted in FIG. 1, OLT 52 is a conduit to fiber optic cables 54*a* through 54*n* (in preferred approach n=32) via optical splitter 60*a*. Of course, other OLTs in PON 40 will support other branches of the PON via other optical splitters 60*b* through 60*n*. As further depicted in FIG. 1, it is contemplated that additional optical splitters (see reference number 61*a*) will exist in the system even at secondary (and deeper) levels toward supporting even further subscribers on each OLT branch via fiber optic cables 56*a* through 56*n*.

Once installer 20 has operably installed UDP 50 on the PON, the configuration may be initiated manually or automatically. Although not relevant to the present invention, it should be understood that communications could be implemented over the PON using a frequency-division, wavelength-division or time-division multiplexing scheme. Thus, for instance, where a time-division multiplexing scheme is used, upon installation (or hard start up) among other possible configuration requirements, ONU 51 must be ranged such that upstream transmissions are inserted by the UDP at the appropriate time onto the PON. For purposes of the present invention, once configuration has completed, the UDP and its ONU can properly communicate with the central office.

Once configuration has been completed, general practice indicates that the installer should verify the receipt of dial tone at the subscriber location. This verification is has generally been performed in all types of telephone networks by operably connecting a butt set (or any other touch tone phone) to the UDP using one of electrical connectors 70. Of course, various types of testing device may be utilized with the present invention as will be apparent in view of the present disclosure. In a preferred approach, installer 20 would connect butt set 21 to the last POTS binding post among the electrical connectors 70 to run this test. While using the last binding post adds some complexity to UDP controller and installer training, it greatly decreases the odds that subscriber 30 will ever pick up a phone set on a line that is in registration mode after a power outage.

In addition to testing for dial tone, the installer 20 may be required to establish the site key for the UDP 50. The site key identifies the customer or UDP 50, which in turn identifies the ONU location and the service parameters associated with the customer or UDP 50. The ONU location is generally the same as the customer location. Where necessary, in a preferred approach, the installer would take the butt set 21 off-hook and enter a "#." In response, the UDP 50 prompts the installer 20 to enter the site key of the location. This prompt may take any form that would be perceivable to the installer 20 including, but not limited to, audible and textual prompts. In the preferred approach using a butt set, audible prompting is most likely. This audio feedback would preferably be generated by ONU 51—in response to download announcements—using the existing voice processing hardware in the ONU.

The installer 20 enters (via the testing device) the site key. The location site key is a numeric code assigned by the utility company for each UDP in the PON. In a preferred approach, this entry will be accomplished using the touch tone keys on the butt set 21 followed by the pound sign. However, another testing device with other forms of manual entry may also be used. In response, to the completed entry of the site key, UDP 50 transmits the site key along with the UDP's serial number (stored in non-volatile memory in the UDP (not shown) to the Element Management System (EMS) via the host digital terminal ("HDT").

Now that configuration of the UDP has been completed, correlation can be performed. If the testing device (e.g. butt sett 21) in not already connected to one of the electrical connectors 70 of UDP 50, the installer would operably connect such a device. Alternatively, it is contemplated that the device may be directly connected to the ONU within UDP 50a (the utility company side of the UDP 50) for correlation. Upon connection, correlation would be initiated. In the approach where electrical connectors 70 are utilized by the installer a manual signal, such as a key activation or series of key activations may be required. In the approach where the installer operably connects the testing device directly to the ONU, the connection, itself, may automatically initiate correlation. Other connections may also be programmed to automatically initiate correlation.

In response to correlation initiation, manual feedback unit 100 will provide a user perceivable instruction to enter a location key for the UDP 50 (a unique integer assigned to the location). This user perceivable instruction may take various forms, such text or audio. Where an audio instruction is used the audio may be stored in various formats, such as CD-audio, ".WAV", MP3, PARCOR speech synthesis, etc. In such an approach, UDP 50 will include a media player or speech synthesizer, depending upon the format in which the audio is stored. It is alternatively possible to include an analog tape player to playback an analog tape recording of various phrases.

The installer, in turn, inputs the digits of the location key. This input may be pre-programmed in the installer's testing device or may be entered manually via a keypad on the testing device. In the preferred embodiment, the location key is an integer, which reflects a customer number already used by the service provider operations support system ("OSS")(e.g. the methods that directly support the daily operation of a LEC) identifying the subscriber 30. More generally, the location code/key is any identifier that can be input via the mechanism provided to the installer that identifies geographic location of the customer. It would be a desirable attribute of the location IDs to be "sparse" so that if the location ID is mis-entered the probability is high that the mis-entered id can be distinguished as a non-valid id rather than the wrong subscriber ID. Where the testing device is a butt set or other telephone-paradigm based device, UDP 50 would be provided with equipment to convert the DTMF tones received into the corresponding digits.

The location key input by the installer 20 is then transmitted to the central office 41. In a preferred embodiment, the location key is placed into an IP package along with the unique identifier for the optical network unit 51 ("ONU"). This IP package is routed over the PON to the OLT 52. In turn, the OLT 52 passes the location key and ONU identifier information to the Element Management System (EMS) 80. It is contemplated that EMS 80 can be provisioned with the remaining pieces of the puzzle so that EMS 80 may correlate the location key with the specific ONU.

The transmitted correlation information will be validated and generally checked for errors. For instance, validation may consider one or more of the following: (1) sufficiency of the information received about the site key; (2) existence of other UDPs on the PON associated with the entered site key; and (3) correct type of the UDP installed at the site. Other potential errors could also be checked as would be understood. This validation may be conducted at any one of various levels, such as the Central Office 41 or the EMS 80.

Once validated, one or more of the OLT 52, central office 41, EMS 80 and/or other EMS modules store the received correlation data. Of course, it would be understood to those of ordinary skill in the art that the correlation could be stored elsewhere in the central office, such as a central router, which would further correlate the location/UDP codes with a OLT identifier to ensure that the traffic to the subscriber is appropriately routed.

Once the correlation is validated and stored, a message may be transmitted to the UDP 50 with instructions to indicate to the installer either: (1) successful registration or (2) erroneous correlation. In a preferred approach, an "erroneous correlation: indication could be accompanied by commands that cause the UDP to provide directions to the installer 20 on how to handle errors in the ONU Location Correlation process.

The installer would then re-initialize correlation after correcting any errors in installation. In the cases where the installer 20 is unable to successfully correlate the UDP, the installer would have to call into a center to resolve the problem.

At the completion of an installer registering UDP 50, the EMS will have made the correlation between the appearance of UDP 50 on the PON 40 and the site at which the UDP 50 is located (i.e. fiber 54a via splitter 60a, fiber 53 and OLT 52). Thus, the network now has all the information it needs to activate any services that have been pre-provisioned for the site.

What is claimed is:

1. A method for correlating a subscriber unit in a point to multipoint network with a geographic location, the method comprising:
   prompting, with the subscriber unit, an installer to input a location code associated with a subscriber, the location code permitting identification of the geographic location of the subscriber,
   wherein the subscriber unit includes a network interface configured to receive and transmit signals over the point to multipoint network, wherein the signals include at least one of voice content, video content and data content, and
   wherein the subscriber unit is configured to connect subscriber equipment to the subscriber unit to facilitate transfer of the at least one of voice content, video content and data content between the point to multipoint network and the subscriber equipment;
   receiving the location code in the subscriber unit; and
   transmitting the location code and a subscriber unit identifier via the network from the subscriber unit to a central repository for storage of the location code and the subscriber unit identifier in the central repository to correlate the subscriber unit with the geographic location.

2. The method of claim 1 further comprising:
   checking the location code for errors;
   upon finding an error, transmitting an instruction to the subscriber unit to indicate the error to the installer; and
   upon finding no errors, correlating the subscriber unit with the geographic location using the location code and the subscriber unit identifier.

3. The method of claim 2 further comprising prompting the installer to reinput the location code upon finding an error.

4. The method of claim 1, wherein the location code permits identification of network service parameters associated with the subscriber unit.

5. The method of claim 1, wherein the point to multipoint network includes a passive optical network (PON).

6. The method of claim 1, further comprising receiving the location code by manual entry of the location code into the subscriber unit by the installer.

7. The method of claim 6, wherein prompting, with the subscriber unit, the installer to input the location code associated with a subscriber includes prompting the installer to manually enter the location code into the subscriber unit.

8. The method of claim 6, further comprising receiving the location code via a butt set device coupled to the subscriber unit.

9. The method of claim 6, wherein transmitting the location code includes transmitting the location code to the central repository via an optical line terminator coupled to the subscriber unit via an optical fiber link.

10. The method of claim 1, further comprising:
    checking the location code for errors; and
    upon detection of an error in the location code, transmitting an indication of the error to the subscriber unit via the network.

11. The method of claim 1, wherein the subscriber unit includes an optical network unit (ONU).

12. The method of claim 1, wherein the subscriber unit identifier includes a serial number.

13. The method of claim 1, further comprising correlating the subscriber unit with the geographic location using the location code and the subscriber unit identifier.

14. The method of claim 1, wherein the subscriber unit is located at the geographic location of the subscriber.

15. The method of claim 1, further comprising activating subscriber services provisioned for the subscriber after the correlation of the subscriber unit with the geographic location.

16. The subscriber unit of claim 15, wherein the point to multipoint network is a passive optical network, and wherein the network interface includes an optical network unit.

17. The method of claim 1,
    wherein the subscriber unit includes an electrical connector, and
    wherein receiving the location code in the subscriber unit comprises receiving the location code from a testing device connected to the electrical connector of the subscriber unit.

18. The method of claim 17, wherein prompting the installer to manually input the location code associated with the subscriber comprises prompting the installer via the testing device connected to the electrical connector of the subscriber unit.

19. The method of claim 1, further comprising placing, with the subscriber unit, the location code and the subscriber unit identifier into an IP package,
    wherein transmitting the location code and the subscriber unit identifier via the network from the subscriber unit to the central repository comprises transmitting the IP package to the central repository via the network interface and the point to multipoint network.

20. The method of claim 1, wherein the network interface is an optical network unit.

21. The method of claim 1, further comprising storing the location code and the subscriber unit identifier in the central repository to correlate the subscriber unit with the geographic location.

22. A subscriber unit for a point to multipoint network, the subscriber unit comprising:
    a subscriber interface that prompts an installer to input a location code associated with a subscriber and receives the location code, wherein the location code permits identification of a geographic location of the subscriber;
    a network interface that transmits the location code and a subscriber unit identifier to a remote device for correlation of the location code with the geographic location,
    wherein the network interface is configured to receive and transmit signals over the point to multipoint network, wherein the signals include at least one of voice content, video content and data content; and
    a subscriber equipment interface configured to couple subscriber equipment to the subscriber unit to facilitate transfer of the at least one of voice content, video content and data content between the point to multipoint network and the subscriber equipment.

23. The subscriber unit of claim 22, wherein the subscriber interface is configured to receive the location code by manual entry of the location code into the subscriber unit by a technician.

24. The subscriber unit of claim 22, wherein the subscriber interface is configured to prompt a technician to manually enter the location code into the subscriber unit.

25. The subscriber unit of claim 24, wherein the subscriber equipment interface includes electrical connectors, and wherein the subscriber interface is configured to receive the location code via a butt set device connected to one of the electrical connectors.

26. The subscriber unit of claim 22, wherein the network interface is configured to receive information packets including voice data for delivery of telephone services to the subscriber.

27. The subscriber unit of claim 22, wherein transmitting the location code and the subscriber unit identifier comprises transmitting an IP package including the location code and the subscriber unit identifier to the remote device via the network interface and the point to multipoint network.

28. The subscriber unit of claim 22, wherein the network interface is an optical network unit.

29. The subscriber unit of claim 22, wherein the point to multipoint network is a passive optical network, and wherein the network interface includes an optical network unit.

30. A method for correlating a subscriber unit in a point to multipoint network with a geographic location, the method comprising:
 prompting, with the subscriber unit, an installer to input a location code associated with a human subscriber into the subscriber unit, the location code permitting identification of the geographic location of the human subscriber, wherein the subscriber unit is located at the geographic location of the human subscriber,
 wherein the subscriber unit includes a network interface configured to receive and transmit signals over the point to multipoint network, wherein the signals include at least one of voice content, video content and data content, and
 wherein the subscriber unit is configured to connect subscriber equipment to the subscriber unit to facilitate transfer of the at least one of voice content, video content and data content between the point to multipoint network and the subscriber equipment;
 receiving the location code in the subscriber unit; and
 transmitting the location code and a subscriber unit identifier from the subscriber unit to a remote device via the network for correlation of the subscriber unit with the geographic location based on the location code and the subscriber unit identifier.

31. The method of claim 30, further comprising correlating the subscriber unit with the geographic location using the location code and the subscriber unit identifier.

32. The method of claim 31, further comprising activating subscriber services provisioned for the subscriber after the correlation of the subscriber unit with the geographic location.

33. The method of claim 30, further comprising activating subscriber services provisioned for the subscriber after the correlation of the subscriber unit with the geographic location.

34. The subscriber unit of claim 33, wherein the point to multipoint network is a passive optical network, and wherein the network interface includes an optical network unit.

35. The method of claim 30, wherein the network interface is an optical network unit.

36. The method of claim 30, further comprising storing, with the remote device, the location code and the subscriber unit identifier to correlate the subscriber unit with the geographic location.

37. A point to multipoint network comprising:
 a remote device;
 a first line connected to the remote device;
 a passive splitter connected to the first line opposite the remote device;
 a plurality of additional lines connected to the passive splitter opposite to the first line; and
 a plurality of subscriber units, each of the subscriber units of the plurality of subscriber units connected to one of the additional lines opposite to the passive splitter,
 wherein each subscriber unit of the plurality of subscriber units includes a network interface that receives and transmits signals over the point to multipoint network, wherein the signals include at least one of voice content, video content and data content, and
 wherein each subscriber unit of the plurality of subscriber units is configured to connect subscriber equipment to the subscriber unit to facilitate transfer of the least one of voice content, video content and data content between the point to multipoint network and the subscriber equipment,
 wherein each subscriber unit of the plurality of subscriber units sends a subscriber unit identifier associated with the subscriber unit and a location code associated with a subscriber using the subscriber unit to the remote device via one line of the plurality of additional lines, the passive splitter and the first line,
 wherein, for each subscriber unit of the plurality of subscriber units, the location code permits identification of a geographic location of the subscriber using the subscriber unit,
 wherein the remote device receives the subscriber unit identifiers and the location codes from the plurality of subscriber units, and, for each subscriber unit of the plurality of subscriber units, correlates the subscriber unit with the geographic location of the subscriber using the subscriber unit by associating the subscriber unit identifier associated with the subscriber unit and the location code received from the subscriber unit.

38. The point to multipoint network of claim 37, wherein, for each subscriber unit of the plurality of subscriber units, the remote device activates subscriber services provisioned for the subscriber using the subscriber unit after the correlation of the subscriber unit with the geographic location of the subscriber using the subscriber unit.

39. The point to multipoint network of claim 37, wherein the first line is a first optical line, wherein the passive splitter is a passive optical splitter, wherein the plurality of additional lines includes a plurality of additional optical lines, and wherein, for each subscriber unit of the plurality of subscriber units, the network interface includes an optical network unit.

* * * * *